No. 686,386. Patented Nov. 12, 1901.
F. H. CHEYNE.
SPEED GOVERNOR.
(Application filed Feb. 2, 1901.)
(No Model.) 3 Sheets—Sheet 1.
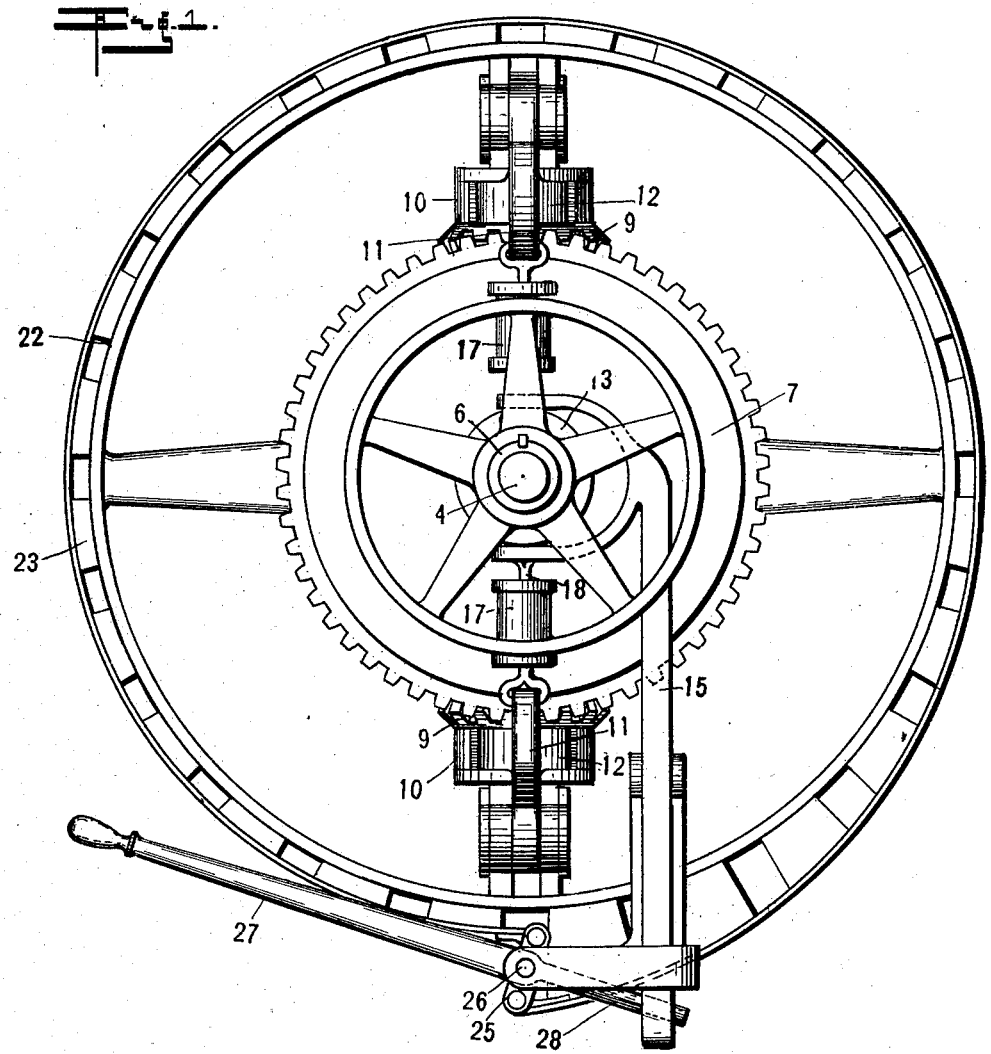
Witnesses
Frank A Fahle
Bertha M. Ballard
Inventor
Frederick H. Cheyne
By
Arthur M. Hood
Attorney
THE NORRIS PETERS CO., PHOTO-LITHO., WASHINGTON, D. C.

No. 686,386.　　　　　　　　　　　　　　　　　　　　　Patented Nov. 12, 1901.
F. H. CHEYNE.
SPEED GOVERNOR.
(Application filed Feb. 2, 1901.)
(No Model.)　　　　　　　　　　　　　　　　　　　　　3 Sheets—Sheet 2.
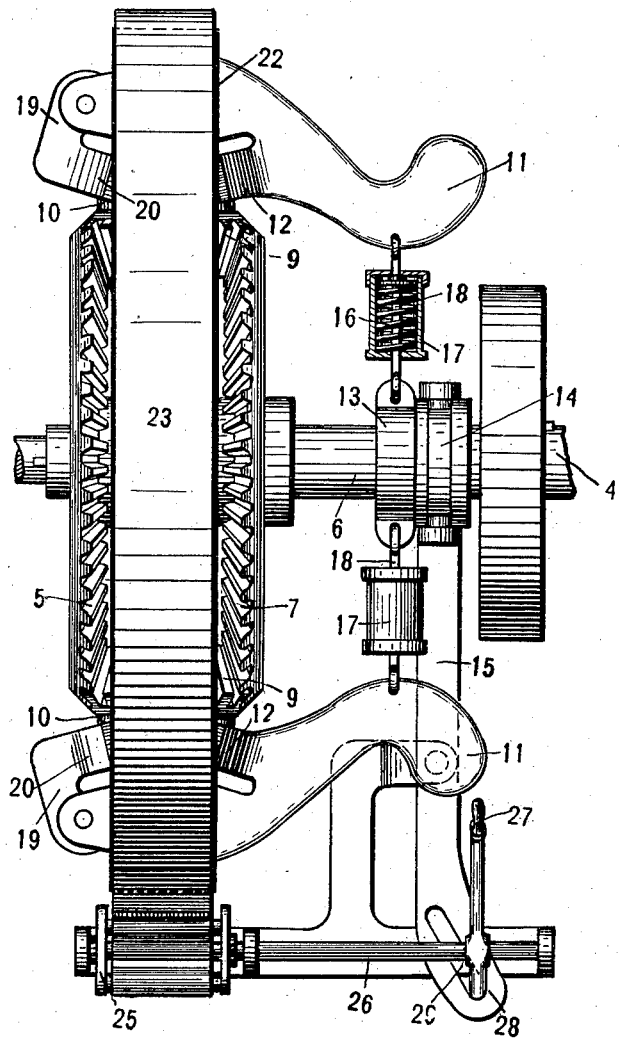

No. 686,386. Patented Nov. 12, 1901.
F. H. CHEYNE.
SPEED GOVERNOR.
(Application filed Feb. 2, 1901.)
(No Model.) 3 Sheets—Sheet 3.
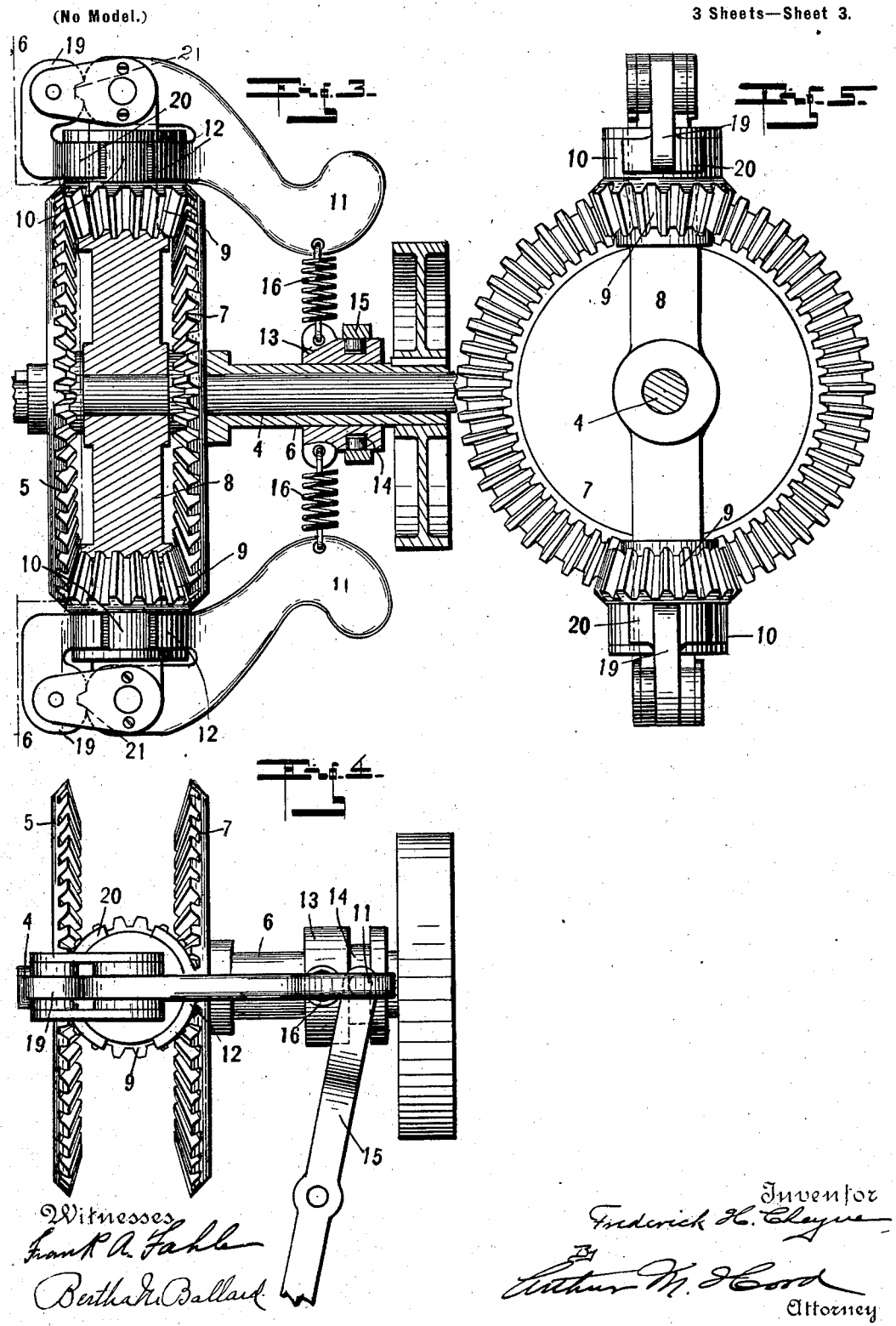
Witnesses
Inventor
Frederick H. Cheyne
Attorney

UNITED STATES PATENT OFFICE.

FREDERICK H. CHEYNE, OF INDIANAPOLIS, INDIANA.

SPEED-GOVERNOR.

SPECIFICATION forming part of Letters Patent No. 686,386, dated November 12, 1901.

Application filed February 2, 1901. Serial No. 45,678. (No model.)

*To all whom it may concern:*

Be it known that I, FREDERICK H. CHEYNE, a citizen of the United States, residing at Indianapolis, in the county of Marion and State of Indiana, have invented a new and useful Speed-Governor, of which the following is a specification.

My invention relates to an improvement in automatic governors for controlling the direction and speed of a driven shaft.

The object of my invention is to produce a neat, compact, and efficient mechanism by means of which the speed of a driven shaft may be controlled so as not to pass beyond a predetermined maximum even though the driving speed be in excess of that required to produce the maximum in the driven part.

A further object of my invention is to provide means coöperating with the governing means by which the direction of the driven shaft may be reversed without shifting or changing the relative position of the intermeshing gears.

A further object is to provide means for varying the maximum speed of the driven part.

The accompanying drawings illustrate my invention.

Figure 1 is a side elevation of my complete mechanism. Fig. 2 is a plan thereof. Fig. 3 is a side elevation, partly in section, of the governing mechanism, the reversing mechanism being omitted. Fig. 4 is a plan of Fig. 3. Fig. 5 is a section on line 6 6 of Fig. 3.

In the drawings, 4 indicates a shaft to which is secured a bevel-gear 5. Rotatable upon shaft 4 is a sleeve 6, to which is secured a bevel-gear 7, preferably of the same size as gear 5, gear 7 and sleeve 6 being integral, if desired. Mounted between gears 5 and 7 and revoluble upon shaft 4 is a supporting frame or bar 8, upon each end of which is journaled upon an axis, preferably at right angles to shaft 4, a beveled pinion 9, each of said pinions being provided with a hub 10. Frame 8 is extended beyond each pinion, and pivoted to each extended end is a lever 11, carrying a friction-shoe 12, arranged to engage the periphery of the adjacent hub 10. Revolubly and longitudinally movable upon sleeve 6 is a collar 13, provided with a peripheral groove 14, adapted to receive the pins of a shifting yoke 15, by means of which it may be shifted longitudinally upon the sleeve. Arranged between the outer end of each lever 11 and collar 13 is a spring 16, which normally tends to draw the free ends of levers 11 together, so as to clamp shoes 12 upon the hubs 10 of pinions 9. For a purpose which will hereinafter appear each spring 16 is inclosed in a cylinder 17 and engages said cylinder and piston 18, mounted within the cylinder. Cylinder 17 and piston 18 are attached to collar 13 and the free end of lever 11, in the drawings cylinder 17 being attached to the lever and piston 18 to the collar.

In order to increase the friction upon the pinions 9, auxiliary levers 19 19, provided with friction-shoes 20, may be pivoted one adjacent each lever 11. In this case a tooth-and-socket connection 21 will be formed in the adjacent ends of the two levers 11 and 19, so that an outward swing of lever 11 will result in a simultaneous withdrawal of the two shoes 12 and 20 from engagement with the hubs 10.

If used in connection with any mechanism which needs to be reversed in direction of operation, I have provided the reversing mechanism now to be described, the arrangement being such that a reversal of the driven part may be obtained without throwing any of the gears out of mesh.

Secured to frame 8 and encompassing the pinions and levers carried thereby is a friction-wheel 22. Surrounding wheel 22 is a friction-band 23, the ends being attached to the opposite ends of a lever 25, carried by a rock-shaft 26, having an operating-lever 27 secured thereto. The arrangement is such that by a partial rotation of shaft 26 the band 23 may be clamped tightly about wheel 22, so as to prevent any rotation of frame 8. As soon as a rotation of frame 8 is prevented it becomes necessary to allow pinions 9 to rotate about their own axes, and this result is accomplished by means of the engagement of the lower end 28 of lever 27 in an inclined slot 29 of lever 15, the arrangement being such that when band 23 is clamped upon wheel 22 lever 15 will be thrown so as to shift collar 13 upon sleeve 6 and bring piston 18 into engagement with the outer end of cylinder 17 and force the outer ends of levers 11 apart, so as to withdraw shoes 12 and 20 from engagement with the pinion-hubs 10. As soon as this is accomplished a rotation of either one of gears 5 and 7 will result, through pinions 9, in a reverse rotation of the other gear. The speed of reverse rotation may be controlled by varying the friction exerted by band 23 upon wheel 22. By throwing lever 27 in the opposite direction band 23 is loosened about pulley 22 and collar 13 is shifted along sleeve 6, so as to increase the tension of springs 16, thus making it possible to establish any desired maximum of driven speed.

When lever 27 is in position to allow a free rotation of frame 8, the faces 12 and 20 of levers 11 and 19, respectively, are clamped upon hubs 10 with sufficient force to prevent any rotation of the pinions 9 about their axes. In this condition if either gear 5 or 7 be rotated the other gear is driven thereby at the same speed and in the same direction, frame 8 revolving with the other parts, so as to give pinions 9 a planetary motion. If the driving speed becomes too great, however, levers 11 and 19 will separate against the action of the springs 16, and thus slightly withdraw shoes 12 and 20. Immediately pinions 9 rotate about their own axes, thus allowing the driven gear to lag behind the other. In actual practice if the driving speed is greater than the desired maximum there will be both a planetary and a rotative movement of pinions 9, the slippage of said pinions beneath shoes 12 and 20 being just sufficient to compensate for the difference between the driving speed and the desired maximum as established by the tension of springs 16.

If desired, intermeshing lugs or sockets may be formed upon pinions 9 to positively engage levers 11 and 19.

It will be readily understood that friction-gears may be substituted for the toothed gears shown, if desired.

I claim as my invention—

1. A speed-governor consisting of a pair of gears, a third gear meshing with said pair of gears and having an axis at an angle to the axes of said pair of gears, a support for said third gear allowing a planetary movement thereof, a clamp carried by the third gear-support, and centrifugally-yielding means for forcing said clamp into engagement with the third gear so as to control the rotation of said gear about its axis.

2. A speed-governor consisting of a pair of gears, a third gear meshing with said pair of gears and having an axis at an angle to the axis of said pair of gears, a support for said third gear allowing a planetary movement thereof, a clamp carried by the third gear-support, centrifugally-yielding means for forcing said clamp into engagement with the third gear so as to control the rotation of said gear about its axis, and means for varying the normal force of said yielding clamping means.

3. A speed-governor consisting of a pair of gears having a common axis, a support revoluble about said axis, a third gear mounted upon said support and meshing with both of said pair of gears, a clamping-lever carried by said support and arranged to engage the third gear and centrifugally-yielding means for forcing said lever into engagement with the third gear to control the rotation of said gear about its axis.

4. A speed-governor consisting of a pair of gears having a common axis, a support revoluble about said axis, a pair of pinions revolubly mounted upon said support and each meshing with both of said gears, a pair of clamping-levers pivoted upon said support, one arranged to engage each pinion to control the rotation thereof about its axis, and yielding means for holding said levers in engagement with their pinions.

5. A speed-governor consisting of a shaft, a gear secured thereto, a sleeve rotatably mounted upon said shaft, a second gear secured to said sleeve, a support mounted upon the shaft, two pinions revolubly mounted upon said support, and each meshing with both of said gears, a pair of clamping-levers pivoted upon said support, one arranged to engage each pinion to control the rotation thereof about its axis, a collar axially movable upon the sleeve, and springs connecting said collar and the free ends of the clamping-levers, the arrangement being such that the position of the levers varies with the speed.

6. A speed-governor consisting of a shaft, a gear secured thereto, a sleeve rotatably mounted upon said shaft, a gear carried by said sleeve, a support mounted upon said shaft, a pair of pinions revolubly mounted upon said support and each meshing with both of said gears, a pair of clamping-levers pivoted upon said support, one arranged to engage each pinion to control the rotation thereof about its axis, a pair of auxiliary clamping-levers one mounted adjacent each pinion in position to engage therewith, connections between the auxiliary lever and adjacent main lever for opposite movement, and yielding means for holding said levers in engagement with their pinions.

7. A speed-governor consisting of a pair of gears having a common axis, a support revoluble about said axis, a pair of pinions revolubly mounted upon said support and each meshing with both gears, a pair of clamping-levers pivoted upon said support, one arranged to engage each pinion to control the rotation thereof about its axis, an auxiliary clamping-lever mounted adjacent each pinion and connected to the adjacent main lever for opposite movement, and yielding means for holding said levers in engagement with their pinions.

8. A speed-governor and reversing mechanism consisting of a pair of gears, a third gear meshing with said pair of gears, and having an axis at an angle to the axis of said pair of gears, a support for said third gear allowing a planetary movement thereof, a clamp carried by the third gear-support, centrifugally-yielding means for forcing said clamp into engagement with the third gear so as to control the rotation of said gear about its axis, means for holding said support to prevent planetary movement of the third gear, and means for releasing said clamp.

9. A speed-governor and reversing mechanism consisting of a pair of gears having a common axis, a support revoluble about its axis, a third gear mounted upon said support and meshing with both of said pair of gears, a clamping-lever carried by said support and arranged to engage the third gear, centrifugally-yielding means for forcing said lever into engagement with the third gear to control the rotation of said gear about its axis, means for preventing the rotation of said support, and means for withdrawing the clamping-lever from the third gear.

10. A combined speed-governor and reversing mechanism consisting of a pair of gears having a common axis, a support revoluble about said axis, a third gear meshing with both of said pair of gears, a friction-wheel carried by said support, a clamping-lever carried by said support, centrifugally-yielding means for holding said clamping-lever in engagement with the third gear to control the rotation thereof about its axis, a band surrounding said friction-pulley, and means for clamping said band upon said pulley and withdrawing the clamping-lever from engagement with the third gear.

11. A combined speed-governor and reversing mechanism consisting of a pair of gears having a common axis, a frame revoluble about said axis and mounted between said gears, a third gear revoluble upon said frame and meshing with both of said pair of gears, a clamping-lever carried by said frame, centrifugally-yielding means for throwing said clamping-lever into engagement with said third gear so as to control the rotation thereof about its axis, a friction-wheel carried by said frame and surrounding said third gear, a band encircling said friction-wheel, means for clamping said band upon said wheel so as to prevent rotation of said frame, and means for releasing said third gear for rotation about its axis.

FREDERICK H. CHEYNE.

Witnesses:
ARTHUR M. HOOD,
BERTHA M. BALLARD.